S. Markel.
Vegetable Cutter.
N° 85,599. Patented Jan. 5, 1869.
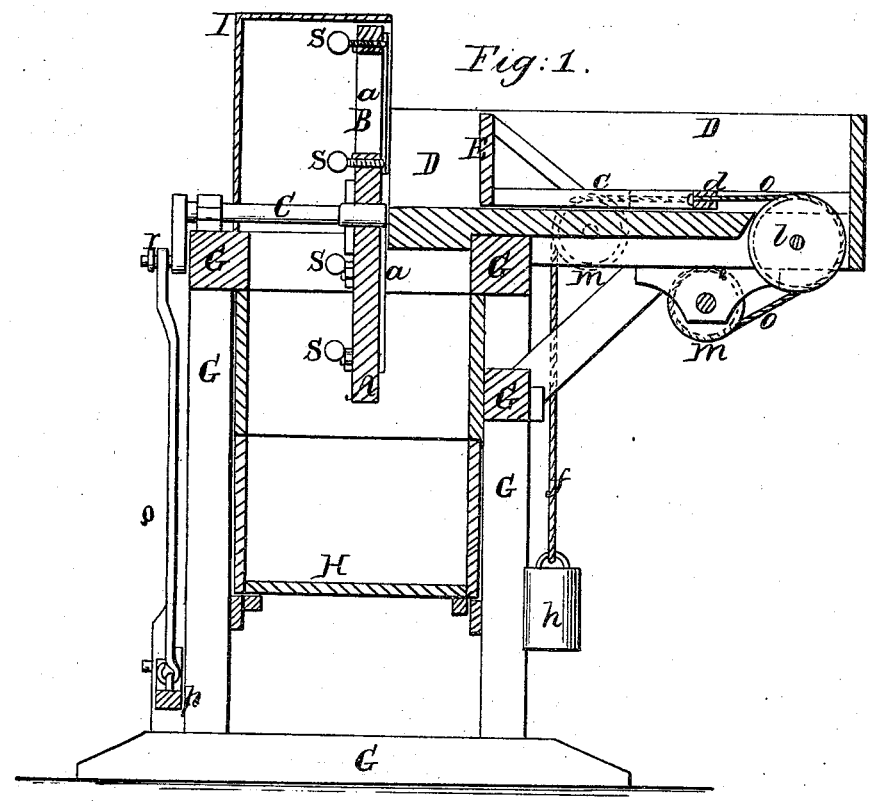
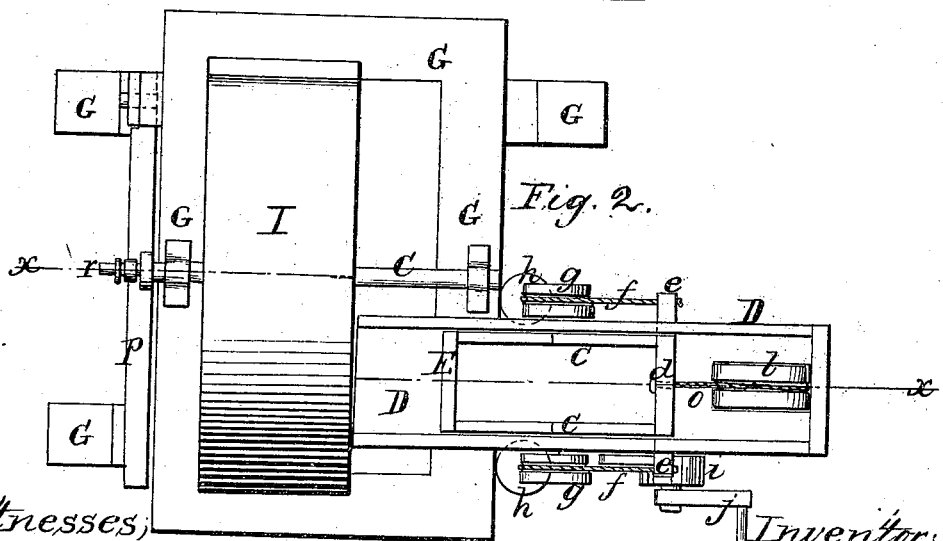
Witnesses:
A. Bennickendorf
Wm. A. Morgan
Inventor,
S. Markel
Per Mnnn & Co. Attys

United States Patent Office.

SAMUEL MARKEL, OF ROSEBURG, PENNSYLVANIA.

Letters Patent No. 85,599, dated January 5, 1869.

IMPROVEMENT IN VEGETABLE-SLICING MACHINE.

The Schedule referred to in these Letters Patent and making part of the same.

*To all whom it may concern:*

Be it known that I, SAMUEL MARKEL, of Roseburg, in the county of Perry, and State of Pennsylvania, have invented a new and improved Vegetable-Slicing Machine; and I do hereby declare that the following is a full, clear, and exact description thereof, which will enable others skilled in the art to make and use the same, reference being had to the accompanying drawings, forming part of this specification, in which—

Figure 1 is a vertical section of my invention through the line $x\ x$ of fig. 2.

Figure 2 is a top view of the same.

Similar letters of reference indicate like parts.

The object of this invention is to provide a machine for slicing up large quarters of vegetables, as cabbage, beets, turnips, and the like.

It consists, in general terms, of a revolving cutter-wheel, arranged with its plane surface across the end of an apron or trough, in which the vegetables are placed, the latter being actuated up to the cutter-wheel by a follow-block, traversing the trough lengthwise, and moved by means of accessory weights, cords, and pulleys.

In the drawings—

A is the cutter-wheel, bearing one or more radial cutters, affixed over the edges of the radial openings B in the said wheel, which latter is mounted on a shaft, C, and arranged, with the surface bearing the cutters, at right angles to the trough D, and near the open end of the latter, as shown, so that the vegetables in the trough will be encountered by the cutters, when the former are moved up by the follow-block E.

I is a case or covering for the cutter-wheel.

The cutters are arranged over the radial openings B, as aforesaid, with the cutters represented thereupon, so as to leave room for the slices to pass through the openings, and fall into the drawer-receptacle H, arranged to slide into the frame G, under the cutter-wheel.

The follow-block E is actuated toward the cutter-wheel by means of the weights $h$ and cords $f$, which latter pass over pulleys $g$, to the cross-piece $d$, affixed to the extensions $c\ c$ of the follow-block.

The ends $e$, of the cross-piece $d$, project through slots in the sides of the trough, as shown, and afford points for the attachment of the cords $f$.

The follow-block is drawn back, for filling the trough, by means of a crank-handle, $j$, drum, $m$, cord, $o$, and pulley, $l$, arranged as shown.

The wheel is driven by a treadle, $p$, connecting-rod, $q$, and crank, $r$, on the end of the shaft C.

The cutter-wheel is provided with adjusting-screws, $s$, which pass through the wheel, and present their points against the cutters, to keep them set at the gauge required for cutting thick or thin slices, as required.

$i$ is a ratchet-wheel on the shaft of the drum $m$, and, with its pawl, serves to hold the follow-block back while the trough is being filled.

Having thus described my invention,

I claim as new, and desire to secure by Letters Patent—

The combination of the rotating cutter-wheel A, adjustable cutters $a$, trough D, follower-block E, and its operating-mechanism, all arranged and operating as described for the purpose specified.

SAMUEL MARKEL.

Witnesses:
ROBERT E. MARSHALL,
D. C. ORRIS.